Oct. 3, 1933.  H. S. REICHARDT  1,929,152
FLY ROD LURE
Filed June 24, 1932
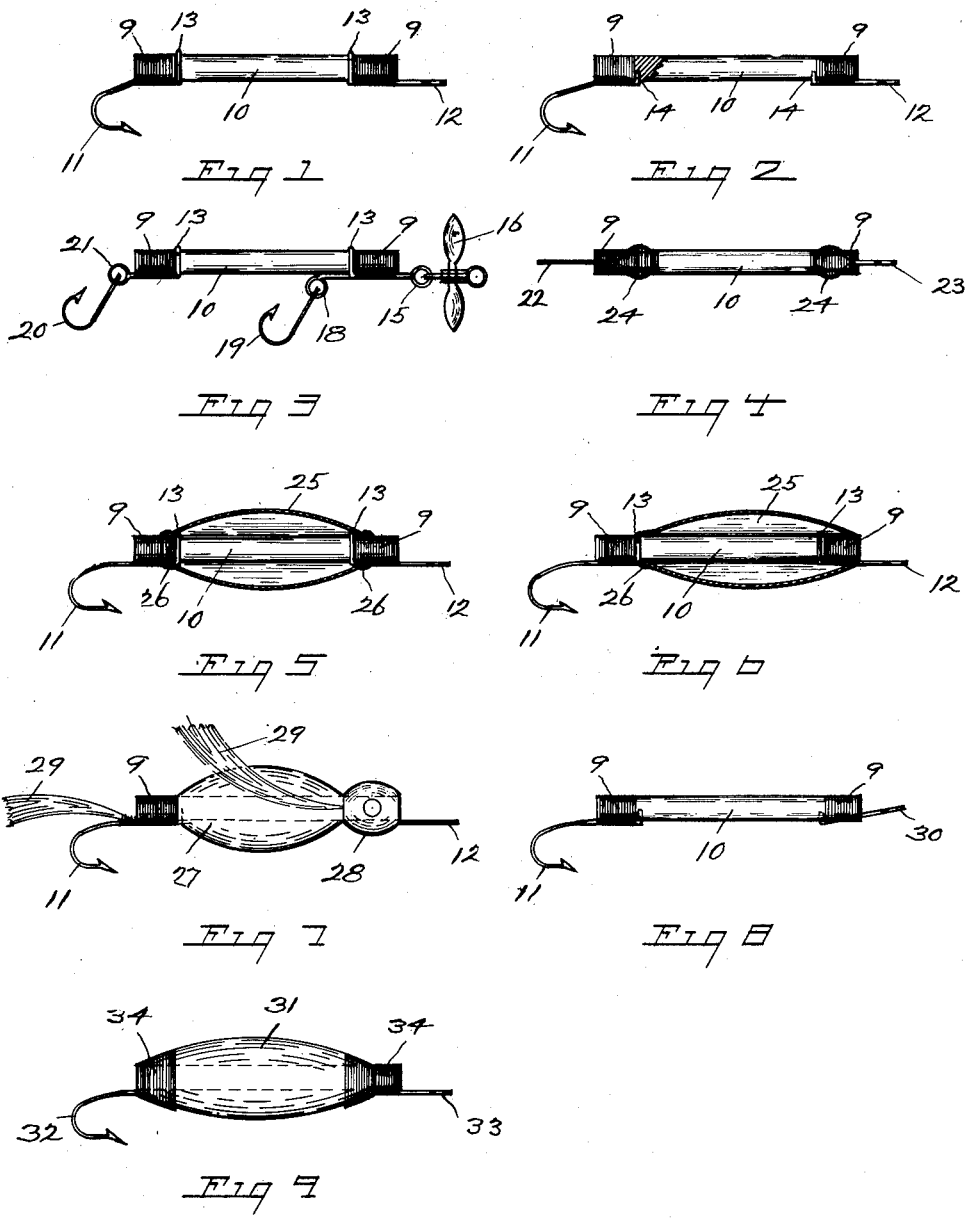
INVENTOR.
Howard S. Reichardt,
BY
ATTORNEY.

Patented Oct. 3, 1933

1,929,152

UNITED STATES PATENT OFFICE 1,929,152

FLY ROD LURE

Howard S. Reichardt, Poughkeepsie, N. Y.

Application June 24, 1932. Serial No. 619,016

1 Claim. (Cl. 43—48)

This invention relates to the construction of a fish hook of that class known as a fly rod lure, and the invention is particularly directed to the novel construction of the device, whereby the following objects are accomplished.

To provide a hook that shall be simple, durable and efficient, being very light in weight and yet so balanced as to be easily cast in fishing and have the proper incline in the water.

Another object being to provide a device of this kind in which the frame or skeleton may be made to a standard design, and bodies of different shapes attached thereto.

A further object of the invention is to provide a lure in which the body may be constructed of light hollow material, and the hollow air-filled to produce a floating effect.

Another object being to provide a hook in which the hook and the eye are spaced apart and secured to a very light frame to reduce the weight and to effect the proper balance of the lure.

With these and other objects in view, my invention consists in a certain novel construction and combination of parts as will hereinafter be fully described and claimed, and illustrated in the accompanying drawing which forms a part hereof and in which like figures of reference refer to corresponding parts in all of the views, but it is to be understood that slight changes may be made without departing from the spirit of the invention.

In the drawing—

Figure 1 shows a side view of the device, without a body, and showing the hook and eye both attached by rings formed in the same.

Figure 2 is a similar view, but shows the hook and eye each formed with a bent tang by which they are secured to the frame.

Figure 3 shows a similar view to illustrate the method of attaching more than one hook, and a spinner.

Figure 4 shows the method of attaching saddle-back hooks to get the weight below the center line.

Figure 5 shows the construction shown in Figure 1 with a body or hollow bead attached thereto, and showing the body in section.

Figure 6 shows a similar view, but with the body extended to the eye end.

Figure 7 shows the device with a body in the form of a bug or fly, and provided with feather wings.

Figure 8 shows the device with the eye set at an angle.

Figure 9 shows a modified form of frame, employing soft wood or cork without the use of a body.

Referring to the drawing—

The device comprises a frame or body 10 made from wood or other light suitable material, to which is secured both the hook 11 and the eye 12, as shown in Figures 1, 3, 5, 6, by a ring 13 which is formed on both the hook 11 and the eye 12 integral therewith and bent at right angles to the shanks thereof.

Said eye 12 is slipped over the frame 10 fitting tightly thereon, and both the frame and the shank are bound with thread 9 to effect a tight union which may be varnished or otherwise coated, and if the device is intended to be used without a body, the frame 10 may be colored as desired.

In Figures 2, 7 and 8, the hook 11 and eye 12 are each formed with a bent end or tang 14 which is entered into a hole formed in the side of the frame 10, and the frame and shank are then bound with the thread 9 in the same manner, the bent end preventing the shank from pulling loose from the frame.

As shown in Figure 3, the eye 15 may have attached thereto a spinner 16, and the eye 15 may be extended and formed with a ring 18 to which is attached the hook 19, and the hook 20 may also be attached by a ring 21 if so desired.

In Figure 4 is shown the underside of the device to illustrate the method of attaching to the frame 10, and the hook 22 and eye 23 which are formed with saddle-back rings 24, which are bound to the frame 10 by the threads 9, thus producing a lure that is weighted upon the bottom.

In Figures 5, 6 and 7, the device is provided with a body, as shown in Figures 5 and 6, as being in the shape of a hollow bead 25 which is slipped over the frame 10, and secured thereto in a water-tight manner by the cement 26 binding the end openings to the frame 10, and thus producing a hollow body containing air to help float the lure upon the water.

In Figure 7, two beads 27 and 28 are employed to produce the effect of a bug with the feather wings 29.

And in Figure 8, the eye 30 is placed at an angle with the axis of the body or frame 10, by being placed in a groove formed in the frame 10, and being bound by the thread 9 in like manner.

In Figure 9, the frame 31 is formed similar to the body and is made from soft wood and the hook 32 and eye 33 are attached directly thereto by the binding 34.

It is to be understood that if desired the frame or rod 10 may be made of either tubular or solid metal.

Having thus described my invention, what I claim as new and desire to secure by, Letters Patent is—

A fish lure, comprising a frame or body rod, an eye provided with a ring embracing one end of said rod, a hook formed with a ring embracing the other end of said rod, and binding means securing said eye and hook to said rod.

HOWARD S. REICHARDT.